US 11,597,440 B2

(12) United States Patent
Seo et al.

(10) Patent No.: US 11,597,440 B2
(45) Date of Patent: Mar. 7, 2023

(54) TRAILING ARM MOUNTING STRUCTURE FOR SPACE FRAME VEHICLE

(71) Applicants: HYUNDAI MOTOR COMPANY, Seoul (KR); KIA MOTORS CORPORATION, Seoul (KR)

(72) Inventors: Seongwook Seo, Hwaseong-si (KR); Mun Soo Cha, Suwon-si (KR); Heedae Oh, Suwon-si (KR); Huensick Min, Hwaseong-si (KR); JeonWoong Kang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/206,933

(22) Filed: Mar. 19, 2021

(65) Prior Publication Data
US 2022/0185374 A1   Jun. 16, 2022

(30) Foreign Application Priority Data
Dec. 16, 2020   (KR) .................. 10-2020-0176382

(51) Int. Cl.
*B62D 21/11*      (2006.01)
*B62D 23/00*      (2006.01)

(52) U.S. Cl.
CPC .............. *B62D 21/11* (2013.01); *B62D 23/00* (2013.01)

(58) Field of Classification Search
CPC ...... B60G 3/12; B60G 7/02; B60G 2200/132; B60G 2204/143; B62D 21/11; B62D 23/00; B62D 25/025; B62D 25/04; B62D 25/2036
See application file for complete search history.

(56) References Cited

U.S. PATENT DOCUMENTS

| | | | | |
|---|---|---|---|---|
| 3,679,017 A * | 7/1972 | Roe | .......................... | B60G 3/14 180/359 |
| 4,641,854 A * | 2/1987 | Masuda | .................. | B60G 7/001 180/385 |
| 5,127,666 A * | 7/1992 | Fujinaka | ................ | B60G 3/202 280/124.153 |
| 5,275,429 A * | 1/1994 | Bunker | ..................... | B60G 7/02 280/124.179 |
| 5,816,606 A * | 10/1998 | Cruise | ...................... | B60G 3/14 280/124.169 |
| 5,882,064 A * | 3/1999 | Emmons | .............. | B62D 23/005 296/193.04 |
| 5,911,426 A * | 6/1999 | Yamamoto | ............... | B60G 3/04 280/124.128 |

(Continued)

FOREIGN PATENT DOCUMENTS

JP        62068103 A  *  3/1987
JP        62068105 A  *  3/1987
(Continued)

*Primary Examiner* — Laura Freedman
(74) *Attorney, Agent, or Firm* — Lempia Summerfield Katz LLC

(57) ABSTRACT

A trailing arm mounting structure for a space frame vehicle includes: a trailing arm mounting portion configured to mount a trailing arm; a side sill including a rear portion on which the trailing arm mounting portion is mounted; and a rear pillar connected to an upper rear portion of the side sill.

9 Claims, 5 Drawing Sheets

(56) References Cited

U.S. PATENT DOCUMENTS

| | | | | |
|---|---|---|---|---|
| 6,042,131 | A * | 3/2000 | Bailey | B60G 7/006 |
| | | | | 280/124.156 |
| 6,655,717 | B1 * | 12/2003 | Wang | B62D 21/183 |
| | | | | 180/908 |
| 7,306,247 | B2 * | 12/2007 | Wu | B60G 21/045 |
| | | | | 280/124.13 |
| 7,600,769 | B2 * | 10/2009 | Bessho | B60G 9/022 |
| | | | | 280/124.109 |
| 8,613,335 | B2 * | 12/2013 | Deckard | F16H 57/0489 |
| | | | | 180/68.1 |
| 9,242,672 | B2 * | 1/2016 | Brady | B60G 3/185 |
| 9,387,751 | B2 * | 7/2016 | Kashiwai | B60K 1/00 |
| 9,623,912 | B2 * | 4/2017 | Schlangen | B62D 25/084 |
| 10,246,153 | B2 * | 4/2019 | Deckard | B62D 27/065 |
| 10,457,330 | B2 * | 10/2019 | Perlo | B62D 23/005 |
| 10,661,626 | B2 * | 5/2020 | Hisamura | B62D 25/088 |
| 2018/0072349 | A1 * | 3/2018 | Hisada | B62D 23/005 |
| 2019/0291521 | A1 * | 9/2019 | Sawai | B60K 17/165 |
| 2020/0298695 | A1 * | 9/2020 | Nagatomi | B60H 1/00507 |

FOREIGN PATENT DOCUMENTS

| | | | | | |
|---|---|---|---|---|---|
| JP | 02037087 | A | * | 2/1990 | |
| JP | 03099985 | A | * | 4/1991 | |
| JP | 07164845 | A | * | 6/1995 | |
| JP | 2006069475 | A | * | 3/2006 | B60G 7/02 |
| JP | 2006168403 | A | * | 6/2006 | |
| JP | 2006219005 | A | * | 8/2006 | |
| JP | 2006315445 | A | * | 11/2006 | B60G 21/052 |

\* cited by examiner

TRAILING ARM MOUNTING STRUCTURE FOR SPACE FRAME VEHICLE

CROSS-REFERENCE TO RELATED APPLICATION

This application claims priority to and the benefit of Korean Patent Application No. 10-2020-0176382, filed on Dec. 16, 2020, the entire contents of which are incorporated herein by reference.

FIELD

The present disclosure relates to a trailing arm mounting structure.

BACKGROUND

The statements in this section merely provide background information related to the present disclosure and may not constitute prior art.

A trailing arm suspension is a type of vehicle suspension in which at least one arm or link is connected to between the axle and pivot point. It is generally used on the rear axle of a vehicle.

The space frame is used in the chassis design of vehicles and motorcycles. In both the space frame and tube frame chassis, the suspension, engine and vehicle body panels are attached to the skeleton frame of the tube, and the vehicle body panel has no structural function, and in a unibody or monocoque design, the body is used as part of the structure.

However, in order to apply the trailing arm suspension to the space frame, a configuration for providing strength such as a mounting bracket is desired, and the vehicle weight increases.

The above information disclosed in this Background section is only for enhancement of understanding of the background of the disclosure, and therefore it may contain information that does not form the prior art that is already known to a person of ordinary skill in the art.

SUMMARY

The present disclosure provides a trailing arm mounting structure that can be applied to a space frame vehicle and can simplify the configuration and reduce vehicle weight.

A trailing arm mounting structure for a space frame vehicle according to one form of the present disclosure may include a trailing arm mounting portion configured to mount a trailing arm, a side sill including a rear portion on which the trailing arm mounting portion is mounted, and a rear pillar connected to an upper rear of the side sill.

The trailing arm mounting portion may include an inner bracket connected to an inner side of the side sill, and an outer bracket connected to an outer side of the side sill.

The side sill, the inner bracket and the outer bracket may be configured to form a mount space in which the trailing arm is mounted.

The side sill may include a side sill upper portion and a side sill inner portion bent toward an inside of the vehicle body from the side sill upper portion, the inner bracket may be connected to the side sill inner portion, and the outer bracket may be connected to the side sill upper portion.

The trailing arm mounting structure may further include a floor member coupled to an inside of the side sill, and an upper part of the inner bracket may be connected to a lower part of the floor member.

The floor member may include a curved portion that is curved upward, and the rear pillar may be connected to the curved portion.

The trailing arm mounting structure may further include a rear pillar bracket supporting the rear pillar and the upper rear of the side sill.

The rear pillar bracket may include a rear pillar side portion that is inclined toward the upper side of the side sill from the rear pillar.

The trailing arm mounting structure may further include a rear side member connected to the side of the side sill, and the outer bracket may be connected to the rear side member.

The side sill may include a side sill upper portion extending from an end of the side sill and a side sill inner portion extending from the end of the side sill and bent from the side sill upper portion toward an inside of a vehicle body, and the outer bracket may be connected with an end of the rear side member and the end of the side sill.

According to the trailing arm mounting structure applicable to a space frame vehicle according to one form of the present disclosure, vehicle weight can be reduced while securing vehicle body strength with a simple configuration.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
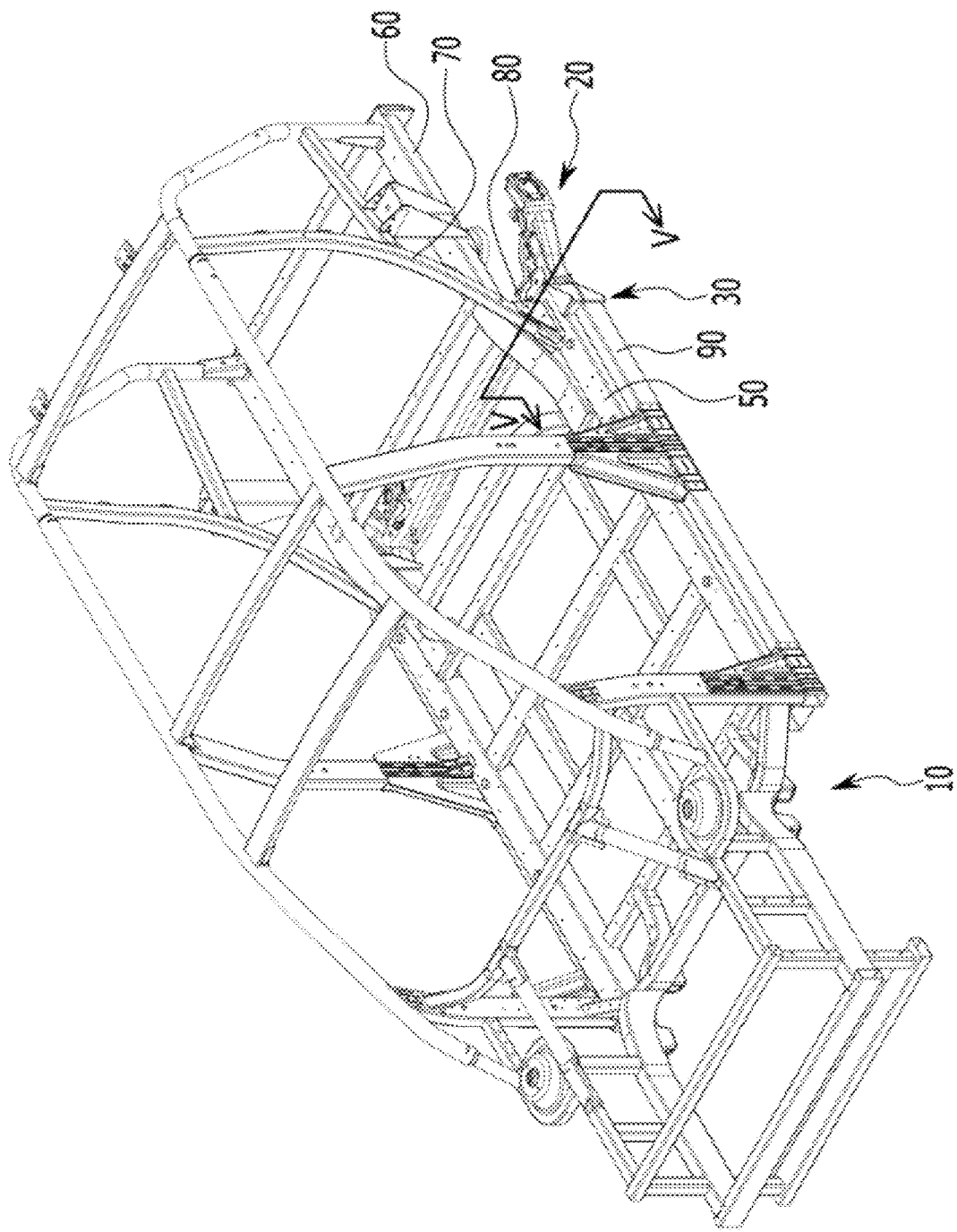
FIG. 1 is a perspective view of a space frame vehicle body to which a trailing arm mounting structure according to one form of the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

One form of the present disclosure will hereinafter be described in detail with reference to the accompanying drawings.

FIG. 1 is a perspective view of a space frame vehicle body to which a trailing arm mounting structure according to one form of the present disclosure may be applied.

The trailing arm mounting structure according to one form of the present disclosure may be applied to mount a trailing arm 20 for a rear wheel on a vehicle body 10 having a space frame.

Figure 2:
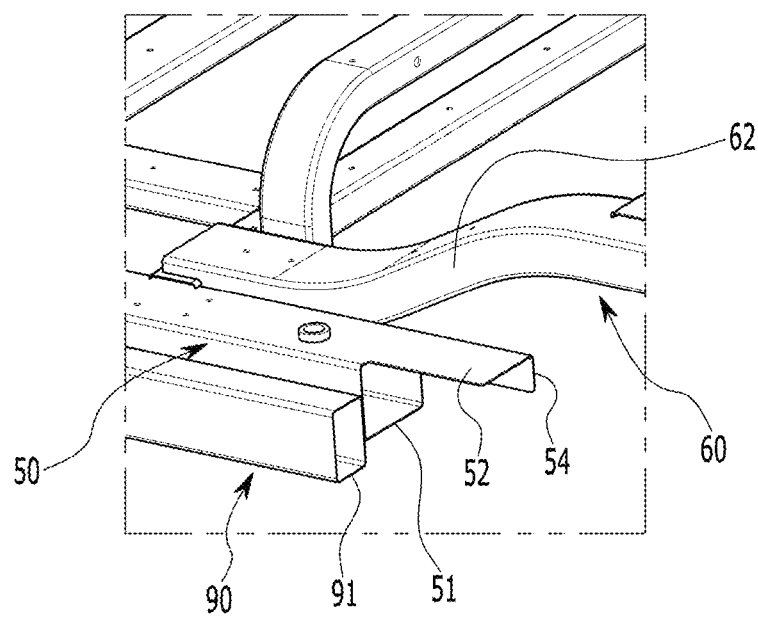
FIG. 2 to FIG. 3 is a partial perspective view of a trailing arm mounting structure of a space frame vehicle according to one form of the present disclosure.
Figure 3:
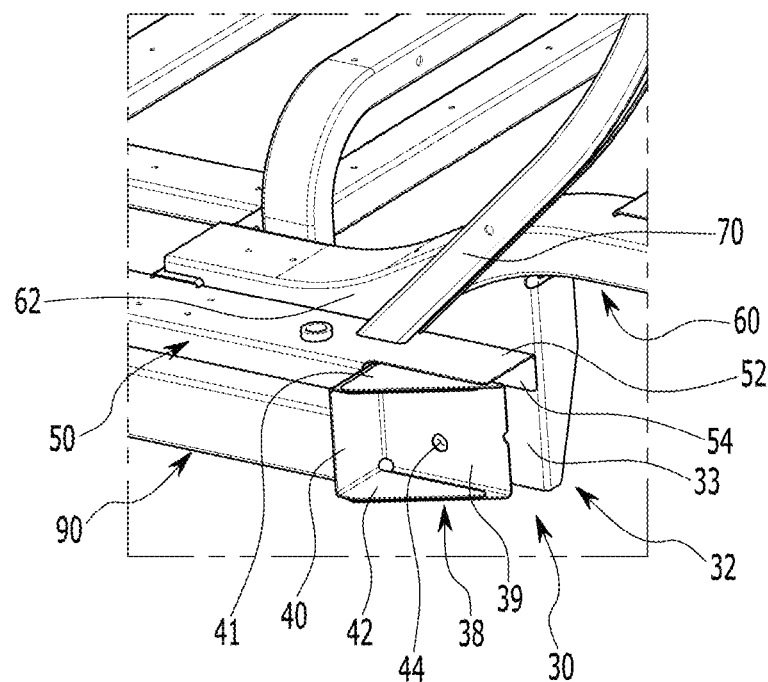
Figure 4:
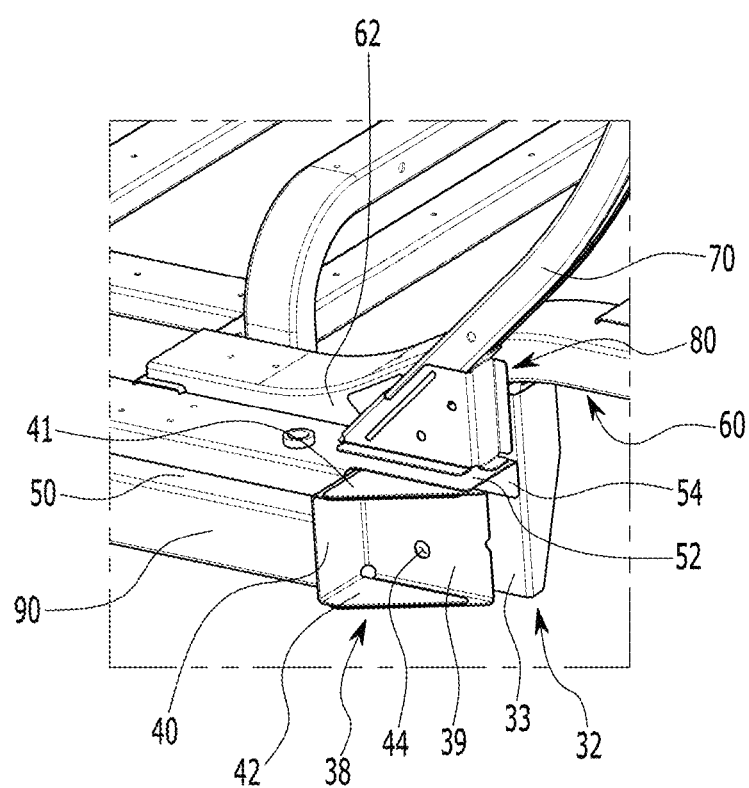
FIG. 4 is a perspective view of the trailing arm mounting structure of a space frame vehicle according to one form of the present disclosure.
Figure 5:
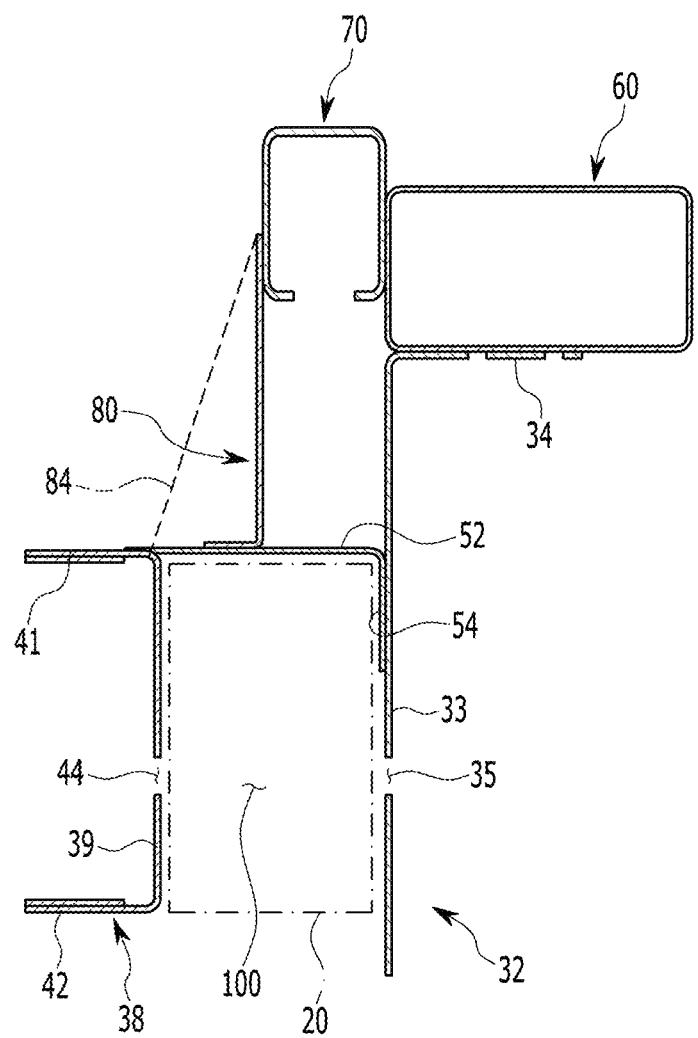
FIG. 5 is a cross-sectional view along the line V-V of FIG. 1.

FIG. 2 to FIG. 3 is a partial perspective view of a trailing arm mounting structure of a space frame vehicle according to one form of the present disclosure, FIG. 4 is a perspective view of the trailing arm mounting structure of a space frame vehicle according to one form of the present disclosure, and FIG. 5 is a cross-sectional view along the line V-V of FIG. 1.

Referring to FIG. 1 to FIG. 5, the trailing arm mounting structure of a space frame vehicle according to one form of the present disclosure includes a trailing arm mounting portion 30 that mounts the trailing arm 20 to the vehicle body 10, and a side sill in which the trailing arm mounting portion 30 is mounted at the rear thereof, and a rear pillar 70 connected to an upper rear of the side sill 50. The rear pillar 70 may be referred to as a C-pillar.

The trailing arm mounting portion 30 may include an inner bracket 32 coupled to the inside of the side sill 50 and an outer bracket 38 coupled to the outside of the side sill 50.

The side sill 50, the inner bracket 32 and the outer bracket 38 may form a mount space 100 in which the trailing arm 20 is mounted.

The side sill 50 includes a side sill upper portion 52 and a side sill inner portion 54 bent to the inside of the vehicle body 10 from the side sill upper portion 52, and the inner bracket 32 is coupled to the side sill inner portion 54, and the outer bracket 38 may be connected with the side sill upper portion 52.

The parts 52 and 54 are extended from an end 51 of the side sill 50, so that the side sill inner portion 54, the side sill upper portion 52, the inner bracket 32 and the outer bracket 38 may form the mount space 100.

The trailing arm mounting structure of the space frame vehicle according to one form of the present disclosure further includes a floor member 60 connected to the inner side of the side sill 50, and the upper portion of the inner bracket 32 may be connected to the lower portion of the floor member 60.

The inner bracket 32 includes an inner bracket interior surface 33 that forms the mount space 100, and an inner bracket flange 34 that is connected with the lower part of the floor member 60, and an inner bracket hole 35 is formed in the inner bracket interior surface 33. The trailing arm 20 may be mounted through the inner bracket hole 35.

The trailing arm mounting structure of the space frame vehicle according to one form of the present disclosure further includes a rear side member 90 coupled to the side of the side sill 50, and the outer bracket 38 may be coupled to the rear side member 90.

One end 91 of the rear side member 90 and one end 51 of the side sill 50 may be joined together to the outer bracket 38. Since the end 91 of the rear side member 90 and the end 51 of the side sill 50 form the same profile, the outer bracket 38 may be joined thereto. For example, the end 91 of the rear side member 90 and the end 51 of the side sill 50 may be welded together with the outer bracket 38, and the welding area of the outer bracket 38 is relatively wide so that it may be firmly joined.

The outer bracket 38 may include an outer bracket first surface 39 forming the mount space 100 and an outer bracket second surface 40 coupled to the end 91 of the rear side member 90 and the end 51 of the side sill 50. In addition, the outer bracket 38 may further include outer bracket side surfaces 41, 42 that are vertically provided to connect the outer bracket first surface 39 and the outer bracket second surface 40. The outer bracket side surfaces 41, 42 connect the outer bracket first surface 39 and the outer bracket second surface 40 so that the road surface load transmitted from the trailing arm 20 is distributed to the vehicle body 10 through the outer bracket 38. The outer bracket side surface 41 provided on the upper part is connected to the side sill upper portion 52. The outer bracket hole 44 is formed in the outer bracket first surface 39 so that the trailing arm 20 may be mounted through the outer bracket hole 44.

The floor member 60 includes a curved portion 62 that is bent upward, and the rear pillar 70 may be coupled to the curved portion 62.

EV vehicles are being developed in accordance with exhaust gas regulations, and EV vehicles are mounted with high-capacity batteries, which increase the weight compared to general internal combustion engine vehicles. Here, the EV vehicle is a concept including a hybrid vehicle, a battery storage EV vehicle and a hydrogen fuel EV vehicle.

Considering the stable mounting of the high-capacity battery and the layout of the vehicle, the method of mounting the high-capacity battery under the vehicle body is used. If the high-capacity battery is mounted under the vehicle body, the floor member may be disposed to the outside of the vehicle.

In the trailing arm mounting structure of a space frame vehicle according to one form of the present disclosure, the floor member 60 may be coupled to the side sill 50, and the curved portion 62 may extend to the rear and upper side of the vehicle body 10. As shown in FIG. 3 to FIG. 5, the strength of the rear pillar 70 and the floor member 60 may be provided by coupling the side of the rear pillar 70 and the side of the curved portion 62.

The trailing arm mounting structure of the space frame vehicle according to one form of the present disclosure further includes a rear pillar bracket 80 supporting the rear pillar 70 and the rear upper part of the side sill 50, which increases strength of the rear pillar 70 and the side sill 50.

Referring to FIG. 5, the rear pillar bracket 80 may include a rear pillar side portion (84; dotted line) sloped from the rear pillar 70 toward the rear upper portion of the side sill 50. That is, a part of the rear pillar bracket 80 is inclined to increase the strength of the rear pillar 70 and the side sill 50.

According to the trailing arm mounting structure applicable to the space frame vehicle according to one form of the present disclosure, a part of the inner bracket 32, the outer bracket 38 and the side sill 50 form the mount space 100 to mount the trailing arm 20, thus providing vehicle body strength with a simple configuration, while reducing vehicle weight.

According to the trailing arm mounting structure applicable to the space frame vehicle according to one form of the present disclosure, the rear pillar 70 is coupled to the upper portion of the mount space 100, and the floor member 60 supports the rear pillar 70 so that road load transmitted from the trailing arm 20 may be properly distributed to the vehicle body 10.

While this disclosure has been described in connection with what is presently considered to be practical exemplary forms, it is to be understood that the disclosure is not limited to the disclosed forms.

DESCRIPTION OF SYMBOLS

10: vehicle body
20: trailing arm
30: trailing arm mounting portion
32: inner bracket
33: inner bracket interior surface
34: inner bracket flange
35: inner bracket hole
38: outer bracket
39: outer bracket first surface
40: outer bracket second surface
41: 42: outer bracket side surface
44: outer bracket hole
50: side sill
52: side sill upper portion
54: side sill inner portion
60: floor member
62: curved portion
70: rear pillar
80: rear pillar bracket
84: rear pillar side portion
90: rear side member
100: mount space

What is claimed is:

1. A trailing arm mounting structure for a space frame vehicle, the trailing arm mounting structure comprising:
    a trailing arm mounting portion configured to mount a trailing arm;
    a side sill including a rear portion on which the trailing arm mounting portion is mounted;
    a rear pillar connected to an upper rear portion of the side sill; and
    a rear side member connected to a side of the side sill,
    wherein the trailing arm mounting portion comprises an outer bracket including a first surface and a second surface,
    wherein the first surface of the outer bracket is disposed to an outer side of the side sill, and the second surface of the outer bracket is attached to an end of the rear side member and an end of the side sill.

2. The trailing arm mounting structure of claim 1, wherein the trailing arm mounting portion comprises:
    an inner bracket connected to an inner side of the side sill.

3. The trailing arm mounting structure of claim 2, wherein the side sill, the inner bracket and the outer bracket are configured to form a mount space in which the trailing arm is mounted.

4. The trailing arm mounting structure of claim 3, wherein:
    the side sill includes:
        a side sill upper portion; and
        a side sill inner portion bent toward an inside of a vehicle body from the side sill upper portion,
    the inner bracket is connected to the side sill inner portion, and
    the outer bracket is connected to the side sill upper portion.

5. The trailing arm mounting structure of claim 2, further comprising a floor member coupled to an inside of the side sill,
    wherein an upper part of the inner bracket is connected to a lower part of the floor member.

6. The trailing arm mounting structure of claim 5, wherein the floor member includes a curved portion curved upward, and the rear pillar is connected to the curved portion.

7. The trailing arm mounting structure of claim 1, further comprising a rear pillar bracket supporting the rear pillar and the upper rear portion of the side sill.

8. The trailing arm mounting structure of claim 7, wherein the rear pillar bracket includes a rear pillar side portion that is inclined toward an upper side of the side sill from the rear pillar.

9. The trailing arm mounting structure of claim 1, wherein:
    the side sill includes a side sill upper portion extending from the end of the side sill, and a side sill inner portion extending from the end of the side sill and bent from the side sill upper portion toward an inside of a vehicle body.

* * * * *